(12) United States Patent
Kang

(10) Patent No.: US 9,039,576 B2
(45) Date of Patent: May 26, 2015

(54) CURVED TRACK SIMULATION DEVICE

(76) Inventor: Too Hwan Kang, Seoul (KR)

(*) Notice: Subject to any disclaimer, the term of this patent is extended or adjusted under 35 U.S.C. 154(b) by 143 days.

(21) Appl. No.: 13/984,491

(22) PCT Filed: Feb. 14, 2012

(86) PCT No.: PCT/KR2012/001101
§ 371 (c)(1),
(2), (4) Date: Aug. 8, 2013

(87) PCT Pub. No.: WO2012/111957
PCT Pub. Date: Aug. 23, 2012

(65) Prior Publication Data
US 2013/0316827 A1 Nov. 28, 2013

(30) Foreign Application Priority Data

Feb. 14, 2011 (KR) .................. 10-2011-0013497

(51) Int. Cl.
| | | |
|---|---|---|
| A63B 71/00 | (2006.01) | |
| A63B 26/00 | (2006.01) | |
| A63B 22/02 | (2006.01) | |
| A63B 24/00 | (2006.01) | |
| A63F 13/20 | (2014.01) | |
| A63B 22/06 | (2006.01) | |
| A63B 69/00 | (2006.01) | |

(52) U.S. Cl.
CPC ........... *A63B 26/003* (2013.01); *A63B 69/0093* (2013.01); *A63B 22/02* (2013.01); *A63B 24/0087* (2013.01); *A63B 2024/0096* (2013.01); *A63F 13/06* (2013.01); *A63B 22/0605* (2013.01); *A63B 2022/0652* (2013.01)

(58) Field of Classification Search
None
See application file for complete search history.

(56) References Cited

U.S. PATENT DOCUMENTS

| | | | | |
|---|---|---|---|---|
| 6,666,802 | B1 * | 12/2003 | Rasmussen .................. | 482/148 |
| 7,374,522 | B2 * | 5/2008 | Arnold ......................... | 482/146 |
| 7,467,681 | B2 * | 12/2008 | Hiramatsu .................... | 180/188 |
| 2008/0070756 | A1 * | 3/2008 | Chu .............................. | 482/54 |
| 2008/0242515 | A1 * | 10/2008 | Odien ........................... | 482/34 |
| 2009/0325767 | A1 * | 12/2009 | Zhou ............................. | 482/51 |

* cited by examiner

*Primary Examiner* — Dmitry Suhol
*Assistant Examiner* — Jason Yen
(74) *Attorney, Agent, or Firm* — John K. Park; Park Law Firm

(57) ABSTRACT

Disclosed is a curved track simulation device. The curved track simulation device is configured such that a base board can rotate and tilt to the left or right and embody left or right cornering motion on an upper surface of a track belt that is rotating and circulating forward and rearward, thus making it possible for a user to feel a sensation as if he/she is enjoying a driving-based or sliding-based leisure activity or sport, and which can appropriately use a combination of frictional force and slippage which are created when the track wheel rotates to the left or right on the track belt, thereby satisfying the dual function of providing both amusement and exercise.

7 Claims, 17 Drawing Sheets

CURVED TRACK SIMULATION DEVICE

TECHNICAL FIELD

The present invention relates, in general, to devices which make it possible for users to perform running or turning motions for driving or sliding exercises, which are increasingly popular as indoor leisure activities, and which enable the users to feel friction and slippage when turning and, more particularly, to a curved track simulation device which is configured such that a base board can rotate and tilt to the left or right and embody a left or right cornering motion on an upper surface of a track belt that is rotating and circulating forward and rearward, thus making it possible for a user to feel a sensation as if he/she is driving or enjoying a sliding-based leisure activity or sport, and which can appropriately use a combination of frictional force and slippage, which are created when the track wheel rotates to the left or right on the track belt, thereby satisfying the functions of both amusement and exercise.

BACKGROUND ART

Many modern people increase their risks of a variety of diseases attributable to overeating, a lack of exercise and excessive stress. Recently, interest in health has led to the development of different kinds of exercise machines which make it possible to exercise indoors. Running machines, stationary bicycles, rowing machines, various weight machines, etc. are representative examples of such indoor exercise machines. These exercise machines are classified into aerobic exercise machines and strength training machines according to the purpose of use. However, many conventional exercise machines have spatial restrictions, and it is not easy to transport and store them. Also, such an exercise machine is only used for a single purpose, that is, only one kind of exercise, so it is difficult for a user to maintain a steady interest in exercising. For instance, a running machine is configured such that a user faces a wall or mirror and only runs, thus eventually becoming bored. A stationary bicycle is used in such a way that a user also faces a wall or mirror and only pedals. As such, the user has to continuously repeat a simple motion to receive the beneficial effects afforded by exercise. This causes the user to lose interest in exercising, thus making it difficult for the user to exercise continuously. In an effort to overcome the above problems, there was proposed a system with an audio-visual apparatus in which a large screen is installed in front of a running machine or stationary bicycle so that the user can have a feeling as if he/she is actually running or riding a bicycle. However, this system is not configured such that the user is actually required to act in response to a given course. In other words, the audio-visual apparatus of the system can only display a curved course on the screen, and does not require the user to actually vary his/her motion to progress along the course. Therefore, in the case of the system provided only with the audio-visual apparatus, it is highly unlikely that a user will experience an increase in his/her interest in exercising, and thus will receive only limited effects of exercise.

TECHNICAL PROBLEM

Accordingly, the present invention has been made keeping in mind the above problems occurring in the prior art, and an object of the present invention is to provide a curved track simulation device which makes it possible for a user to shift his/her center of gravity in a running or sliding posture and actually perform left-right rotation and tilting operation so that the user can embody motion as if he/she is enjoying an actual leisure activity or sport, thus increasing interest in exercising and the effects received thereof.

Another object of the present invention is to provide a curved track simulation device in which when a track wheel rotates to the left or right on a track belt that is rotating and circulating forward and rearward, not only friction is generated between the track wheel and the track belt but slippage is also caused therebetween, so that the user can feel a thrill as if he/she travels along a realistic curved track.

A further object of the present invention is to provide a curved track simulation device which is connected to a physical interactive simulation system, thus enabling the user to enjoy sliding sports regardless of seasons or weather conditions.

Yet another object of the present invention is to provide a curved track simulation device which makes it possible for a user to embody a sliding motion and have a feeling of sliding indoors as if he/she is enjoying an actual outdoor leisure activity or sport, in terms of preventing accidents resulting from the enjoyment of outdoor leisure activities and sports, given the fact that the number of accidents related to youths who enjoy outdoor leisure activities and sports is increasing rapidly, partly because youths form the main age group of people who enjoy high speed sliding leisure sports.

Still another object of the present invention is to provide a curved track simulation device for games, which enables the user to exercise and enjoy a game using a display which is operated in conjunction with the motion of the user, in terms of preventing and curing game addiction, with regard to the fact that many computer games lead to a variety of social problems resulting from game addiction and often cause metal illnesses in youths, which may lead to incidents involving violence.

TECHNICAL SOLUTION

In order to accomplish the above objects, the present invention provides a curved track simulation device for a physical interactive exercise or game machine using a motion simulation, including: an external body frame forming an external body and a frame of the device; a track belt to be rotated by an electric motor and a control boxy that are mounted to the external body frame, the track belt circulating forward and rearward; a track wheel rolling on an upper surface of the track belt and conducting left-right rotation; a direction shaft coupled to the track wheel so that the left-right rotation of the track wheel is conducted by the direction shaft; and a base board conducting left-right rotation and a tilting operation.

ADVANTAGEOUS EFFECTS

A curved track simulation device according to the present invention makes it possible for a user to perform left-right rotation and tilting operation and embody motions such as cornering which are essential when enjoying an actual sliding leisure activity or sport, whereby the user can safely enjoy an exercise indoors and receive beneficial effects of exercise. Therefore, it is expected that the present invention increases the satisfaction of the user and deepens the user's interest so that the user can be on his/her way to a healthier and happier way of life. Moreover, if the curved track simulation device is linked to a simulation system, it can more effectively provide a realistic sensation to the user. Therefore, the present invention can be proposed as a kind of solution to solve the social problems resulting from simple computer games which can cause game addiction and result in users exhibiting antisocial behavior. To achieve the above purposes, the curved track simulation device may be provided with a variety of motion sensors which are operated in conjunction with the operation system of the present invention, so that it can be used for different kinds of game machines. Thereby, the present invention can have the dual effect of both giving the enjoyment of playing a game and providing the benefits of exercise, so the user can exercise while having fun, instead of performing simple and boring conventional exercises.

DESCRIPTION OF THE REFERENCE NUMERALS IN THE DRAWINGS

Figure 1:
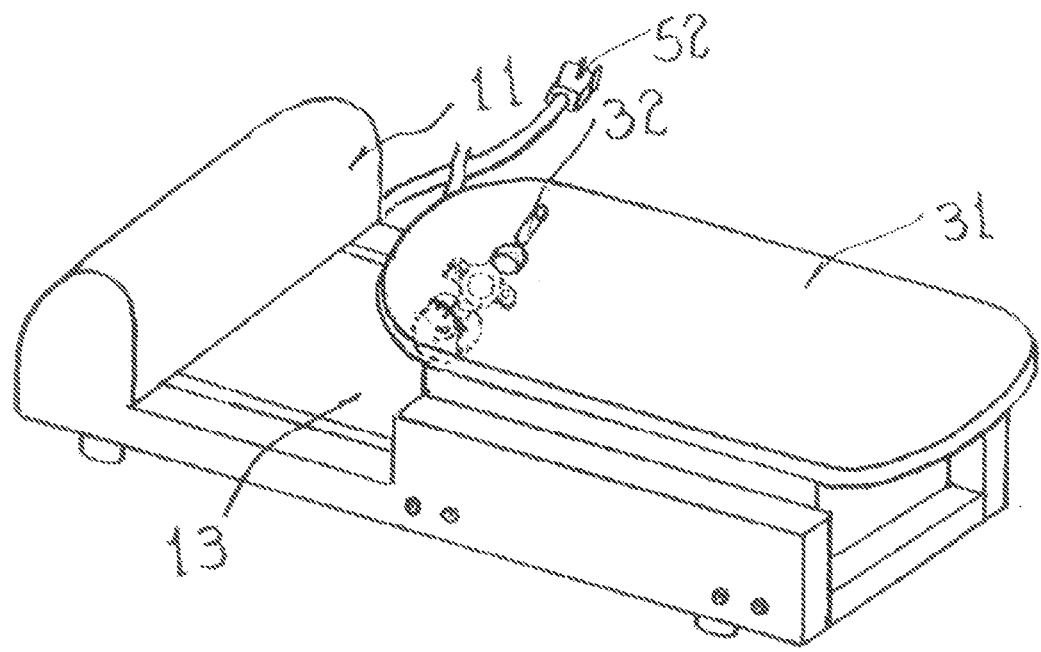
FIGS. 1 through 3 are views showing a curved track simulation device, according to the present invention.

1: curved track simulation device
10: external belt assembly 20: functioning unit assembly
30: track wheel assembly 40: exercise unit assembly
50: electronic device unit

DETAILED DESCRIPTION OF EMBODIMENTS OF INVENTION

Hereinafter, a curved track simulation device according to the present invention will be described in detail with reference to the attached drawings.

Figure 2:
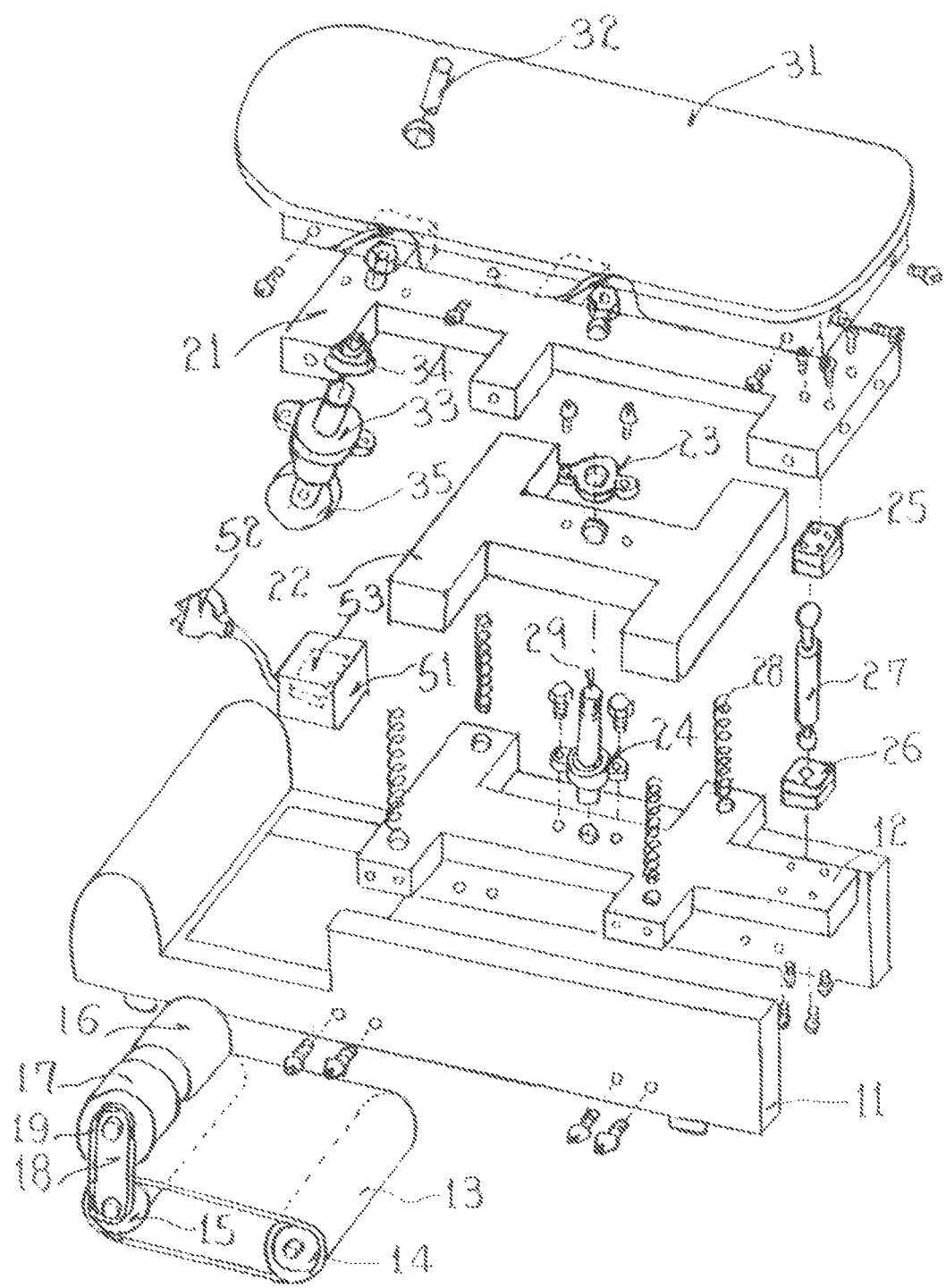
Figure 3:
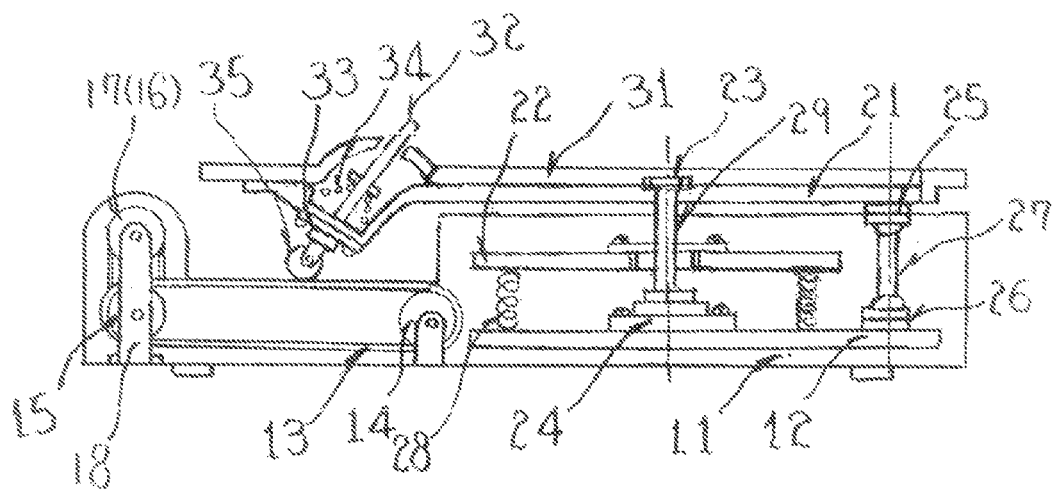

FIG. 1 is a perspective view showing the appearance of a curved track simulation device according to an embodiment of the present invention. FIG. 2 is an exploded perspective view illustrating the construction of the device of FIG. 1. FIG. 3 is a sectional view illustrating the construction and assembly relationship of the device of FIGS. 1 and 2. The curved track simulation device according to the present invention includes an external belt assembly 10, a functioning unit assembly 20, a track wheel assembly 30, an exercise unit assembly 40 and an electronic device unit 50.

The external belt assembly 10 includes: an external body frame 11 which has an external body and a frame; a lower frame 12 which is coupled to the external body frame 11; an electric motor 16 and a reducer 17 which are installed and operated in the external body frame 11; a drive belt 19 which transmits rotating force of the electric motor 16 to a drive roller 15; a mounting bar 18 to which the electric motor 16 and the drive roller 15 are fixed; and a track belt 13 which is operated by rotation of the drive roller 15 and a driven roller 14 in such a way that the track belt 13 circulates around the drive roller 15 and the driven roller 14.

The functioning unit assembly 20 includes: a bearing unit 24 which is coupled to an upper portion of the lower frame 12 and pertains to left-right rotation ($\theta 1$) and tilting operation ($\theta 2$) of the device; a rotating shaft 29 which is mounted to the bearing unit 24; a middle frame 22 which is coupled to the rotating shaft 29 with a bearing 23 and conducts only the tilting operation ($\theta 2$) without pertaining to the left-right rotation ($\theta 1$); spring units 28 which are provided between the lower frame 12 and the middle frame 22 and generate restoring force to maintain level; an upper frame 21 which is disposed above the middle frame 22 and coupled to the rotating shaft 29; a rotation support rod 27 which rotatably supports a lower portion of the upper frame 21 and the upper portion of the lower frame; and rod end bearings 25 and 26 which are coupled to the rotation support rod 27 and mounted to the lower surface of the upper frame 21 and the upper surface of the lower frame 12 so as to enable the rotation support rod 27 to smoothly rotate with respect to the upper and lower frames 21.

Figure 5:
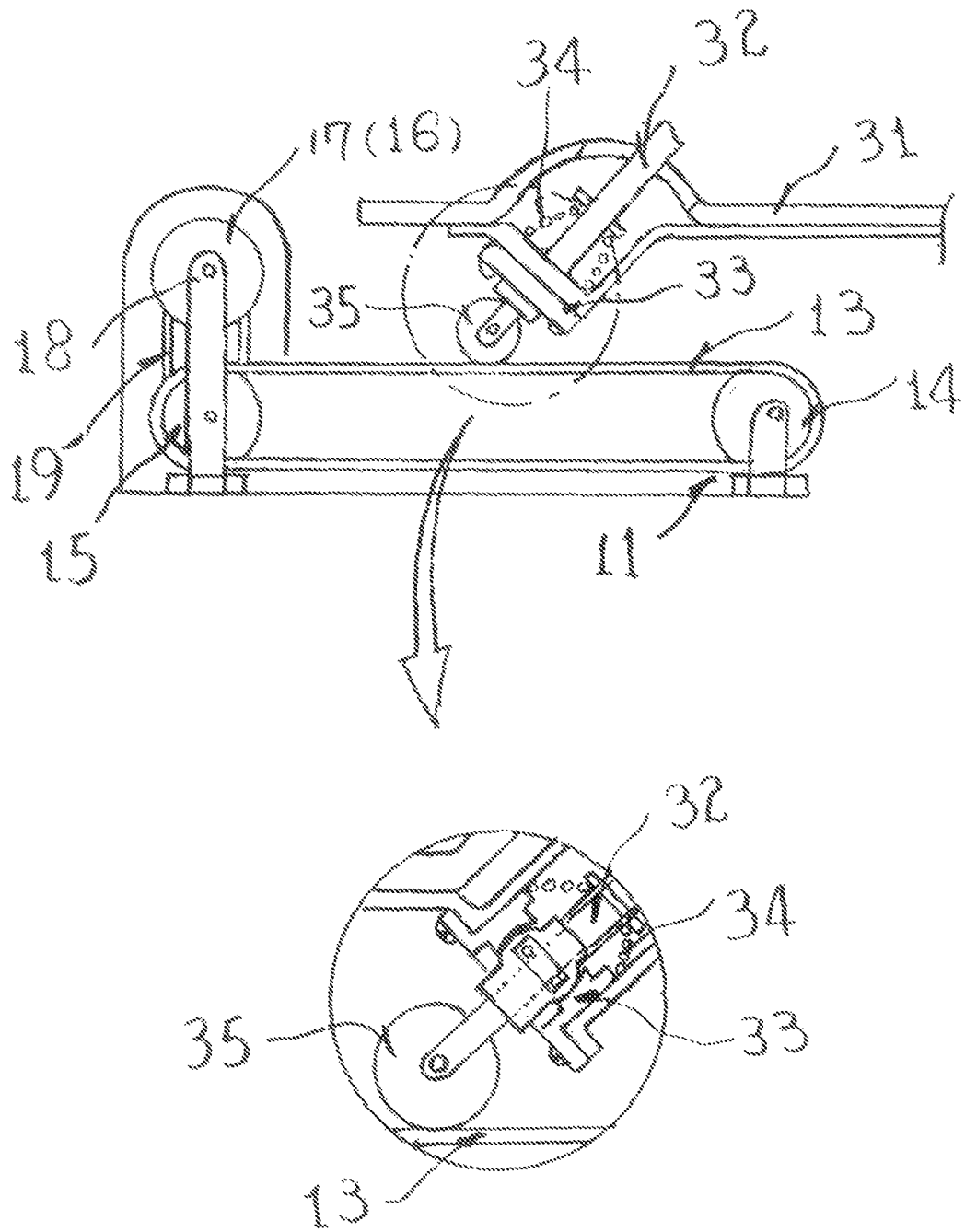
FIG. 5 is a sectional view illustrating a track wheel assembly.

The track wheel assembly 30 includes: a track wheel 35 which rotates on the upper surface of the track belt 13; a bearing unit 33 which enables the track wheel 35 to conduct left-right rotation ($\theta 1$) and tilting operation ($\theta 2$); a direction shaft 32 which is coupled to the track wheel 35 and the bearing unit 33 and turns to the left or right to change the orientation of the device in response to a track course; a spring 34 which is mounted to the bearing unit 33 and provides restoring force to maintain level; and a base board 31 which is coupled to the upper frame 21 to which the track wheel 35 is mounted. The track wheel assembly 30 having the above-mentioned construction is illustrated in detail in FIG. 5.

The exercise unit assembly 40 includes elements which can embody a variety of examples of a machine provided with the curved track simulation device according to the present invention. The construction of the exercise unit assembly 40 is as follows.

The exercise unit assembly 40 includes: a display 41 which more effectively provides a realistic sensation to a user and increases his/her interest and amusement; a handle 42 which is connected to the direction shaft 32 to adjust the direction of the track wheel 35; a first support pole 43 and a second support pole 44 which support the display and the handle 42; an exercise unit body 46 which is provided on an upper surface of the base board 31; a pedal operating unit 47 which is provided in the exercise unit body 46 and is operated to allow the user to actually exercise; and a seat 48 and a seat support 49 which are provided on the base board 31 to allow the user to sit on the seat 48 and exercise. The exercise unit assembly 40 may further include a handle rotating unit 45 which makes it possible to rotate the handle 42. Furthermore, in place of the pedal operating unit 47, ski footrests 36 may be used so that the present invention can be used as a skiing simulation device. The electronic device unit 50 includes: a control box 51 which is connected to a game simulation system to form an interface with each other; a power plug 52 which is provided to supply power to the control box 51; a circuit board 53 which is installed in the control box 51 and governs the control and operation of the device of the present invention; and a sensor 54 which functions as a signal means for converting the operation conditions and the position displacement of the posture of the user depending on the operation into signals and transmitting the signals to the circuit board 53.

Figure 4:
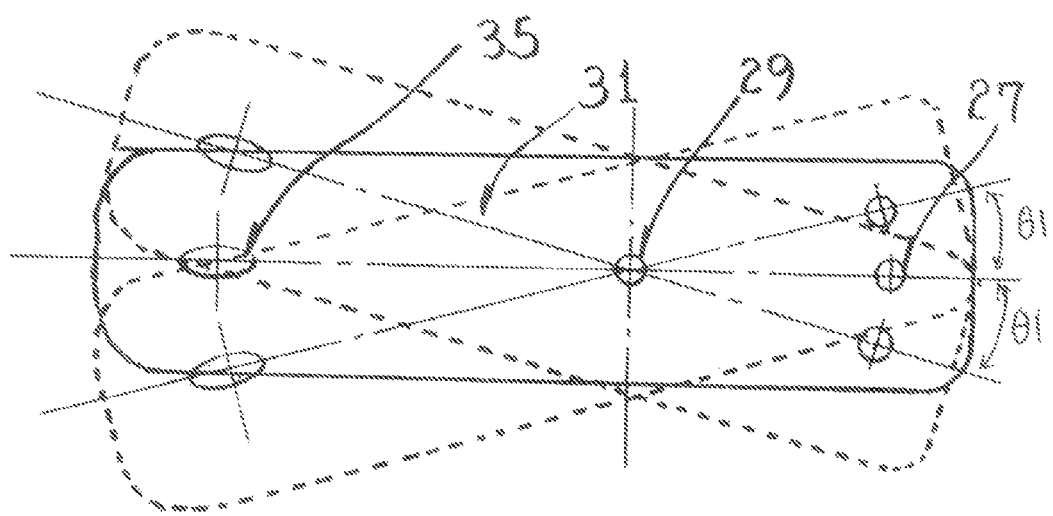
FIG. 4 is a plan view illustrating the rotation of a base board.

The elements and parts of the curved track simulation device according to the present invention have been explained above. Hereinafter, the functional operation of the elements of the curved track simulation device will be described in detail with reference to the related drawings. FIG. 4 is a plan view illustrating the operation of rotating the base board to the left or right. The base board 31 rotates to the left or right around the rotating shaft 29 by a rotation angle of θ1. At this time, the rotation support rod 27 and the track wheel 35 rotate in conjunction with each other, as shown in FIG. 4. The reason why these elements are rotated in the above manner is because the upper end of the rotation support rod 27 is coupled to the rod end bearing 25, and because the upper frame 21 to which the track wheel 35 is coupled is fastened to the base board 31.

Figure 6:
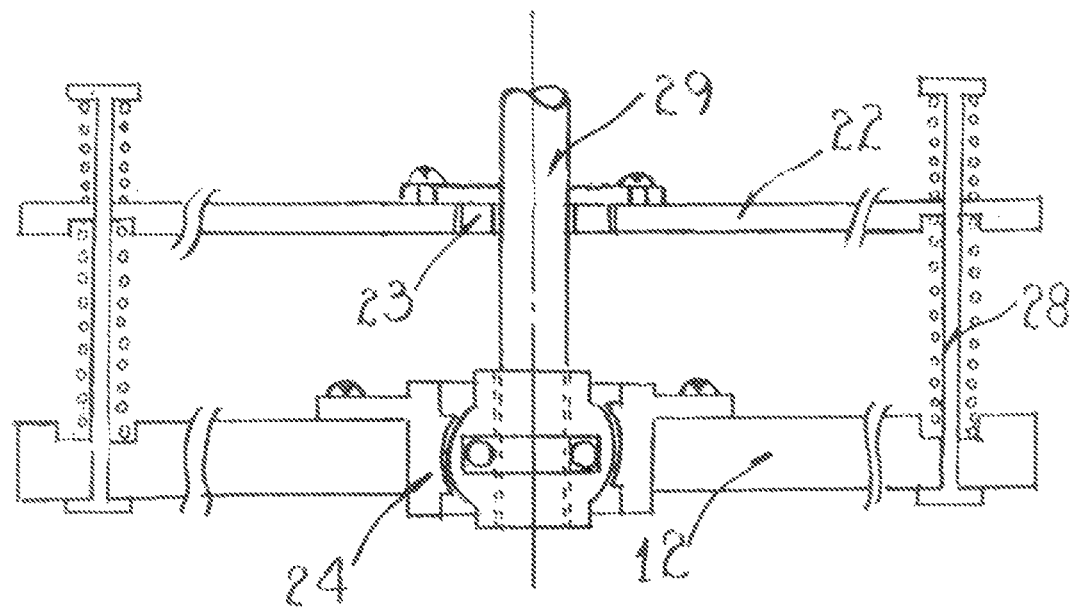
FIGS. 6 through 8 are sectional views illustrating the operation of the base board.
Figure 6:
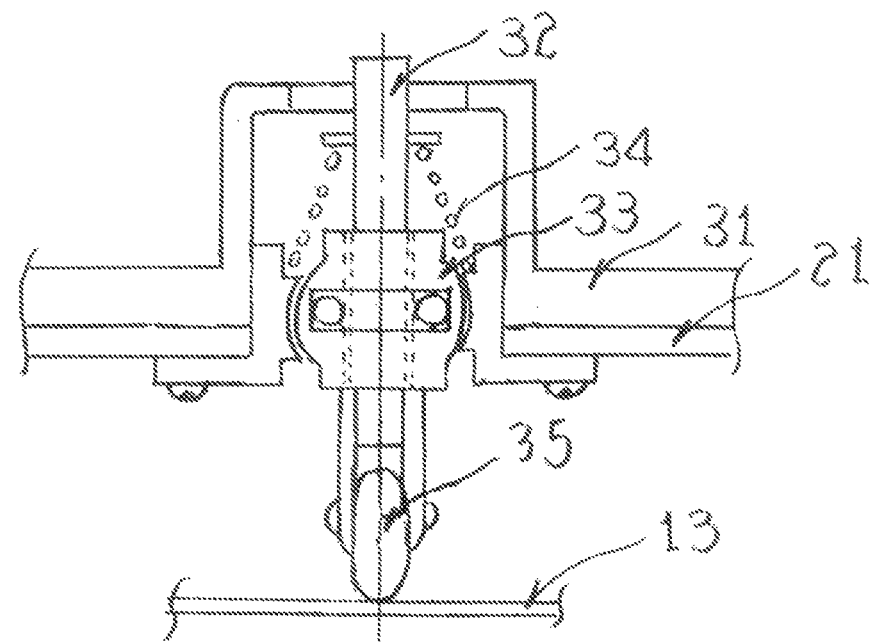
Figure 7:
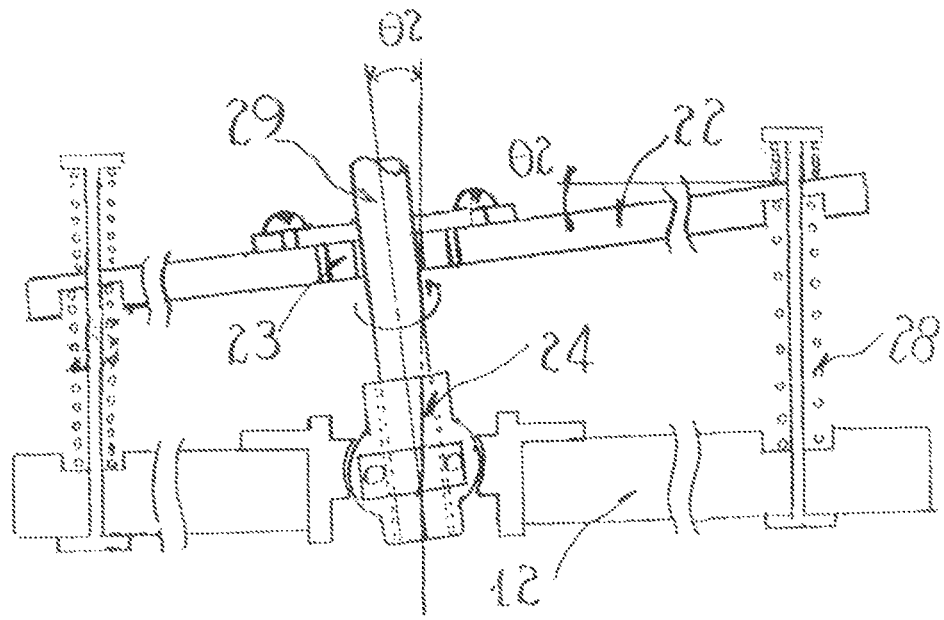
Figure 7:
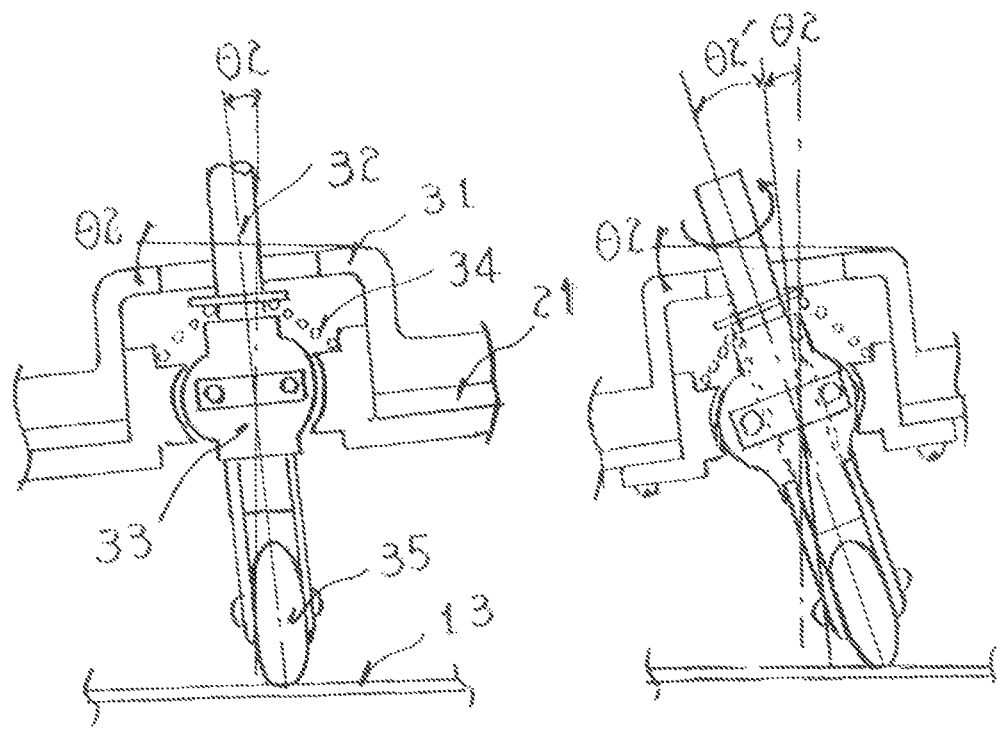
Figure 8:
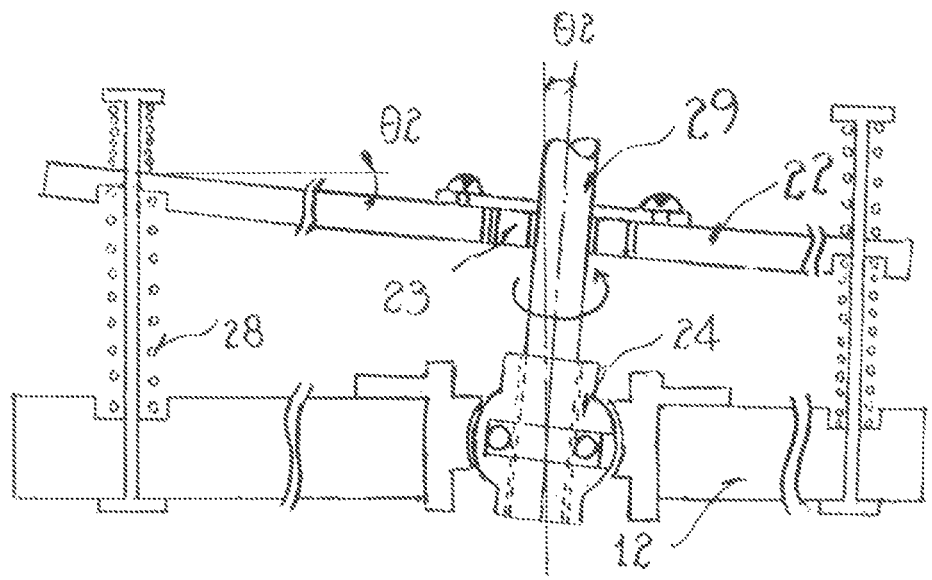
Figure 8:
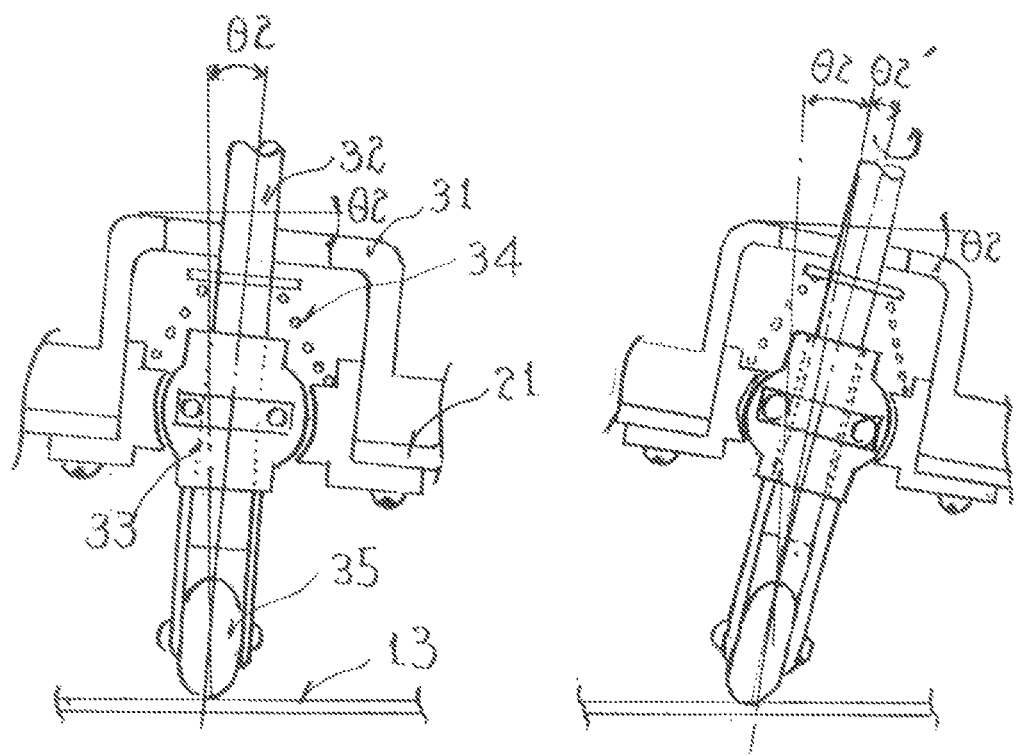

FIGS. 6, 7 and 8 are sectional views, respectively, illustrating the conditions of the device when the base board remains level, when it is tilted to the left, and when it is tilted to the right. As shown in FIG. 6, when the device of the present invention remains level, the rotating shaft 29 and the direction shaft 32 are oriented upright with respect to the ground based on the front view. Furthermore, the bearing units 24 and 33, the spring units 28 and the spring 34 that pertain to the rotating shaft 29 and the direction shaft 32 are disposed at the original positions. The middle frame 22, the upper frame 21 and the base board 31 are oriented horizontally parallel to the ground. On the other hand, as shown in FIG. 7 or 8, if the rotating shaft 29 and the direction shaft 32 are tilted to one side, all the parts pertaining to these are also tilted in the same direction.

As shown in FIG. 7, if the bearing unit 24 is tilted to the left, the rotating shaft 29 is tilted along with the bearing unit 24, and the middle frame 22 provided with the bearing 23 is also tilted in the same direction at the same angle. At this time, an upper portion of the left spring unit 28 is expanded while a lower portion thereof is compressed. On the contrary, an upper portion of the right spring unit 28 is compressed while a lower portion thereof is expanded. The elastic force of the spring unit 28 generates restoring force by which the parts are returned to their original positions, in other words, to the horizontal state. Meanwhile, the bearing unit 33 to which the track wheel 35 is coupled is also tilted to the left in the same manner as those of other related parts.

In FIG. 7, the middle frame 22, the upper frame 21, the base board 31 and the track wheel 35 are illustrated as being tilted at the same angle θ2. As stated above, if the middle frame 22 is tilted at θ2 by the spring unit 24, the weight of the user is applied to the spring unit 33 which is coupled to the track wheel 35, so that the spring unit is further tilted by θ2', thus causing a slip phenomenon. The rotation angle θ2' is determined in the angle range within which the bearing unit 33 can be tilted.

As the rotation angle θ2' increases, the restoring force for returning the bearing unit 33 to the horizontal state is also increased. In the meantime, because the track wheel 35 comes into contact with and rolls on the track belt 13 that is rotating and circulating forward and rearward, the slip phenomenon occurs. At this time, the user will instinctively turn the handle 42 to the opposite direction to remain level. This will be explained later herein with reference to FIG. 10.

Figure 9:
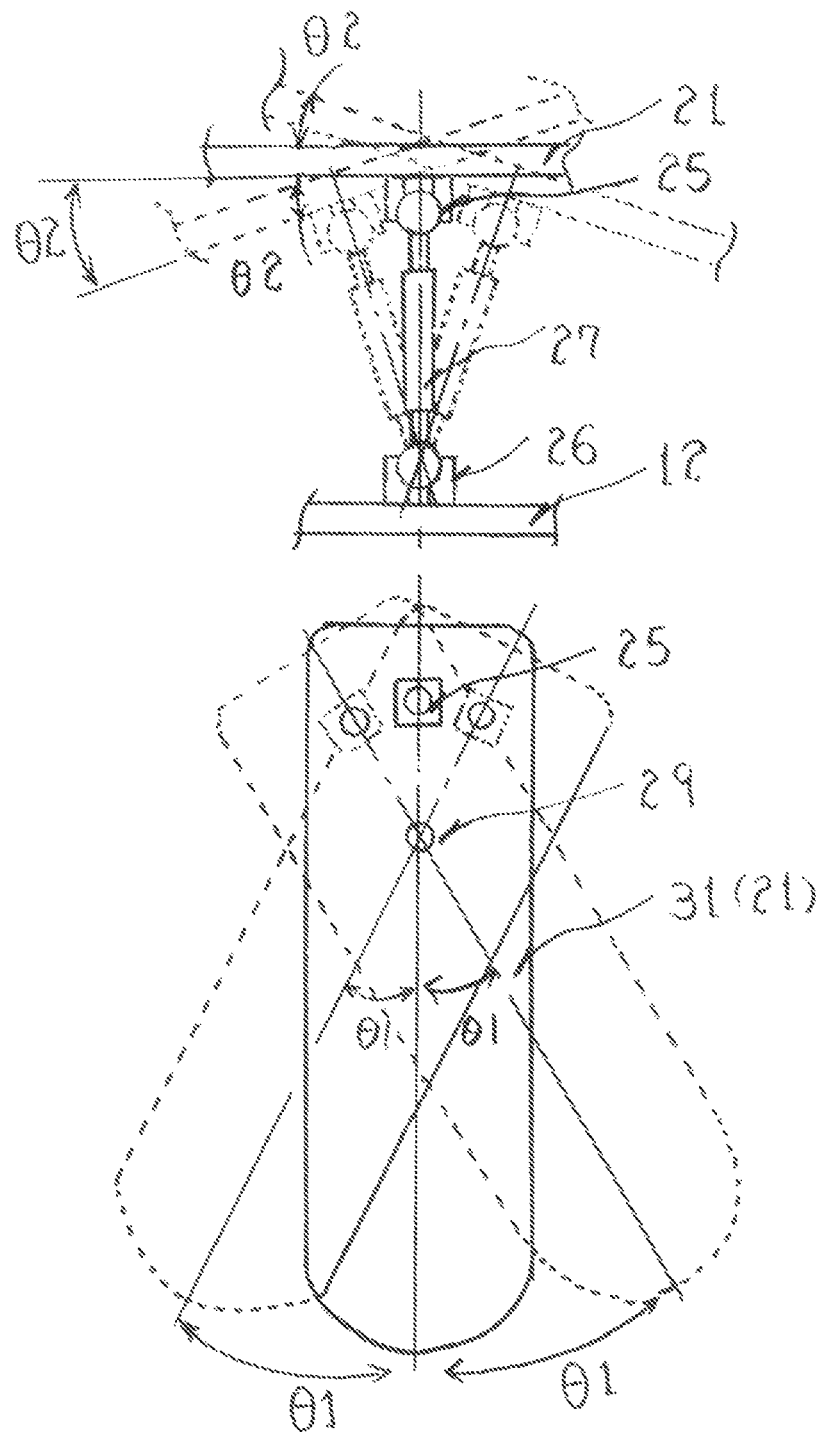
FIG. 9 is of a front view and a plan view illustrating the operation of a rotation support rod.

FIG. 9 is of a front view and a plan view illustrating the operation of the rotation support rod. If the base board 31 rotates around the rotating shaft 29 by the rotation angle of θ1, the rod end bearing 25 coupled to the upper frame 21 is also rotated by the rotation angle of θ1. At this time, because the rod end bearing 26 is fixed on the upper surface of the lower frame 12, the rotation support rod 27 is rotated by the rotation of the rod end bearing 25 that is coupled to the upper frame 21. When the rod end bearing 25 coupled to the upper frame 21 rotates around the rod end bearing 26 coupled to the lower frame 12, the base board 31 is tilted by θ2. The board tilting angle θ2 by which the base board 31 is tilted is determined within a predetermined angular range, because the base board 31 is supported by the rotation support rod disposed below it.

Figure 10:
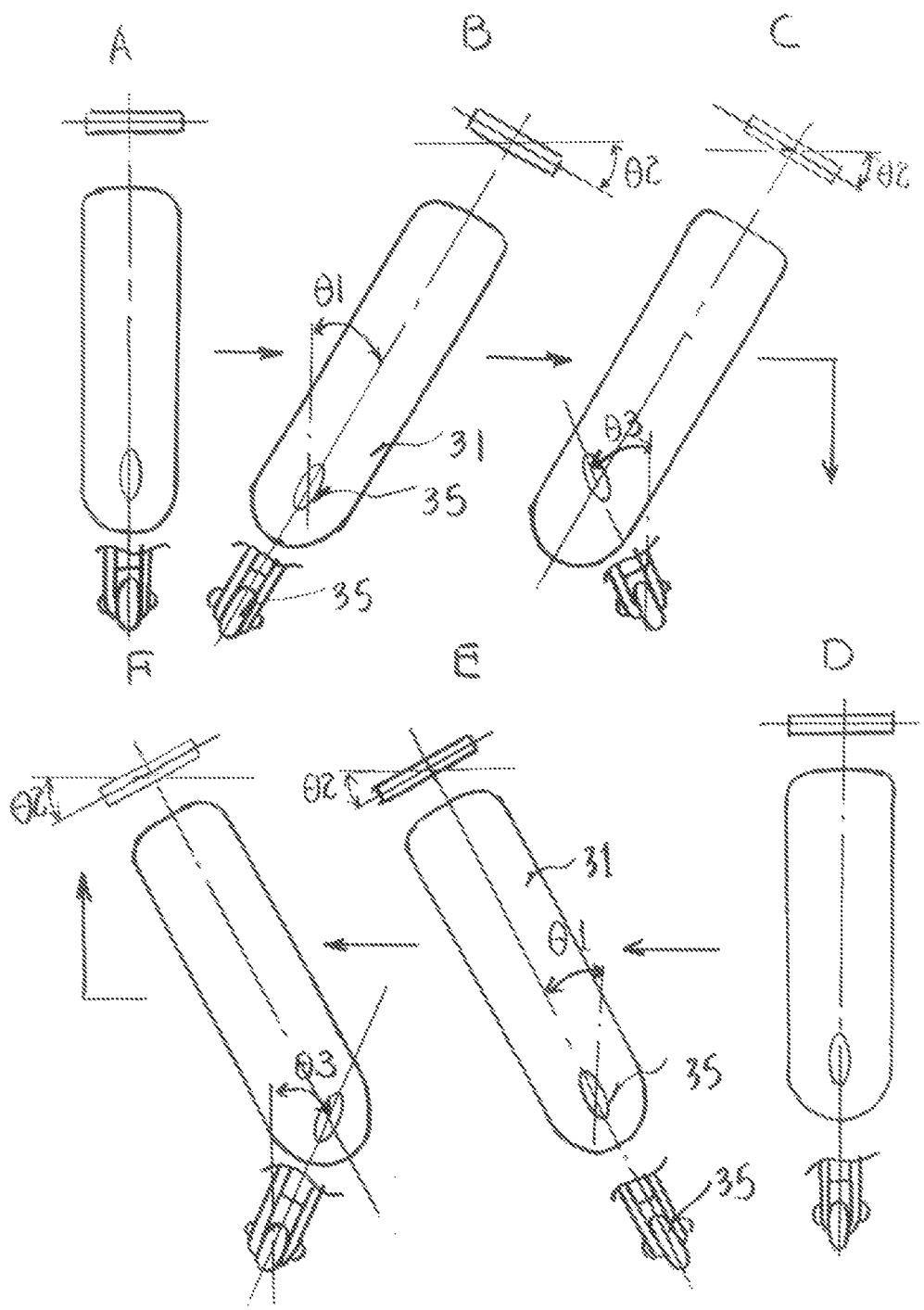
FIG. 10 is of views illustrating the operation of a handle.

FIG. 10 is of views illustrating, in chronological order, the operation of the device depending on rotating the handle to the left or right. "A" of FIG. 10 illustrates the conditions of the base board 31 and the track wheel 35 which are in the horizontal state at an initial stage of the operation. In this case, the rotation angle of the base board 31 is 0°. "B" of FIG. 10 shows a state in which the base board has rotated by θ1. Also, the base board 31 is tilted by θ2 by rotation of the rotation support rod 27. At this time, the rod end bearing 26 coupled to the track wheel 35 is further tilted by θ2', so a slip phenomenon is caused. The user instinctively turns the handle 42 in the direction in which the base board 31 returns to its original horizontal state. "C" of FIG. 10 illustrates a state in which the handle has rotated by θ3. When the handle 42 is rotated by θ3, comparatively large frictional force and slippage occur between the track wheel 35 and the track belt 13 that is rotating and circulating forward and rearward. Then, the base board 31 that has been tilted by the rotation angle θ1 returns to the original horizontal state. "D" of FIG. 10 shows the base board which has returned to the horizontal state and is maintained such that the rotation angle thereof is 0°. As shown in "D" of FIG. 10, to maintain the device horizontal, the rotation angle θ3 of the handle must be appropriately adjusted so that the frictional force and slippage which are generated and caused on the track belt 13 can be balanced. However, if the handle is excessively rapidly rotated by a comparatively large rotation angle θ3, the state of "D" of FIG. 10 is converted into the state of "E" of FIG. 10. "E" of FIG. 10 shows the state in which the base board is rotated by θ1 in the opposite direction. In the same manner as the state of "B" of FIG. 10, tilting of the base board by θ2 resulting from the rotation of the rotation support rod is accompanied with the rotation of the base board. Then, frictional force is generated and a slip phenomenon is caused by the track wheel 35 being tilted by θ2', so the user turns the handle 42 so that the device enters the state of "F" of FIG. 10. The state of "F" of FIG. 10 is converted into the state of "A" of FIG. 10 through the above-stated process.

As such, although the device of the present invention does not actually move forward or rearward, it requires the user to maintain balance during exercise, but also provides the user with amusement when he/she is required to adjust the handle 42 to keep his/her balance when frictional force and slippage effects are generated and applied to the track wheel 35 placed on the track belt 13 that is rotating and circulating forward and rearward. For example, the device may be operated in such a way that, while the user adjusts the handle 42 along a course track displayed on the display 41, points are scored or penalty points are imposed.

Figure 11:
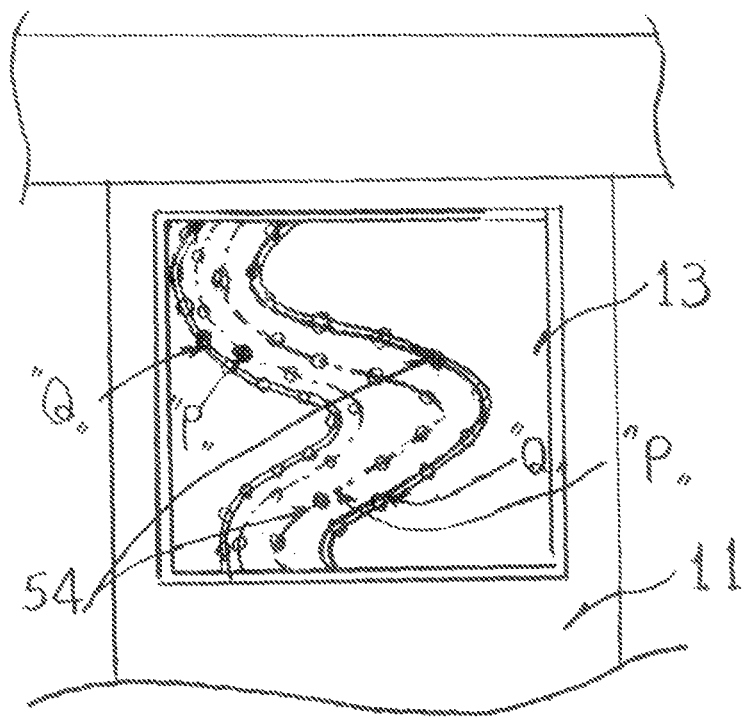
FIGS. 11 and 12 are plan views illustrating a track belt.
Figure 12:
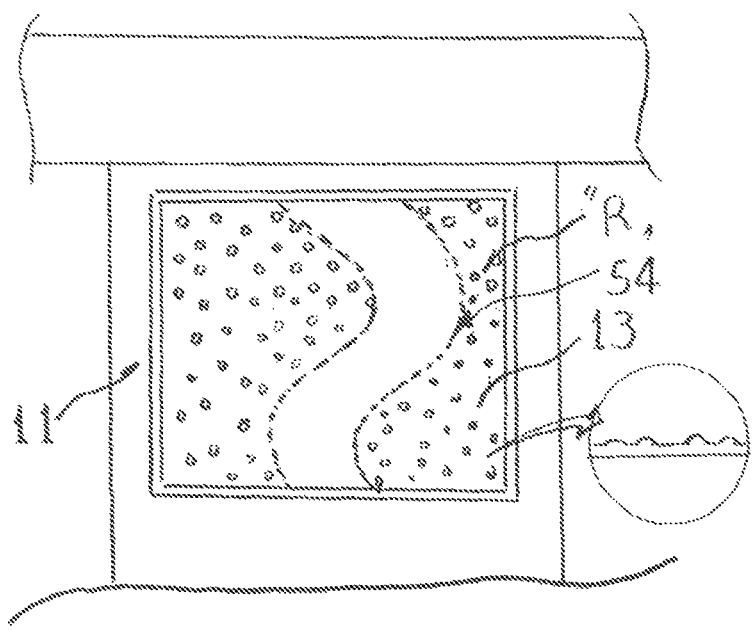

FIG. 11 is a plan view illustrating a score line and a penalty line of the track belt. FIG. 12 is a plan view illustrating an uneven portion formed on the upper surface of the track belt such that if the track wheel passes on the uneven portion, the device vibrates. In detail, referring to FIG. 11, the device is provided with a sensor which can recognize a track course of the track belt 13 that has a score line P and a penalty line Q. When passing through the score line P, points are added, and when passing through the penalty line Q, points are subtracted. If such a track course is linked to a game, it can effectively arouse a user's interest. In the case of FIG. 12, if the user drives the device out of a given track course, the track wheel 35 passes on the uneven portion R formed on the upper surface of the track belt 13 and thus vibrates so that the user can feel the vibrations. If this is connected to a game which is played on the display, the device of the present invention can be use as a game machine which can give a sense of reality and more effectively arouse a user's interest.

Figure 13:
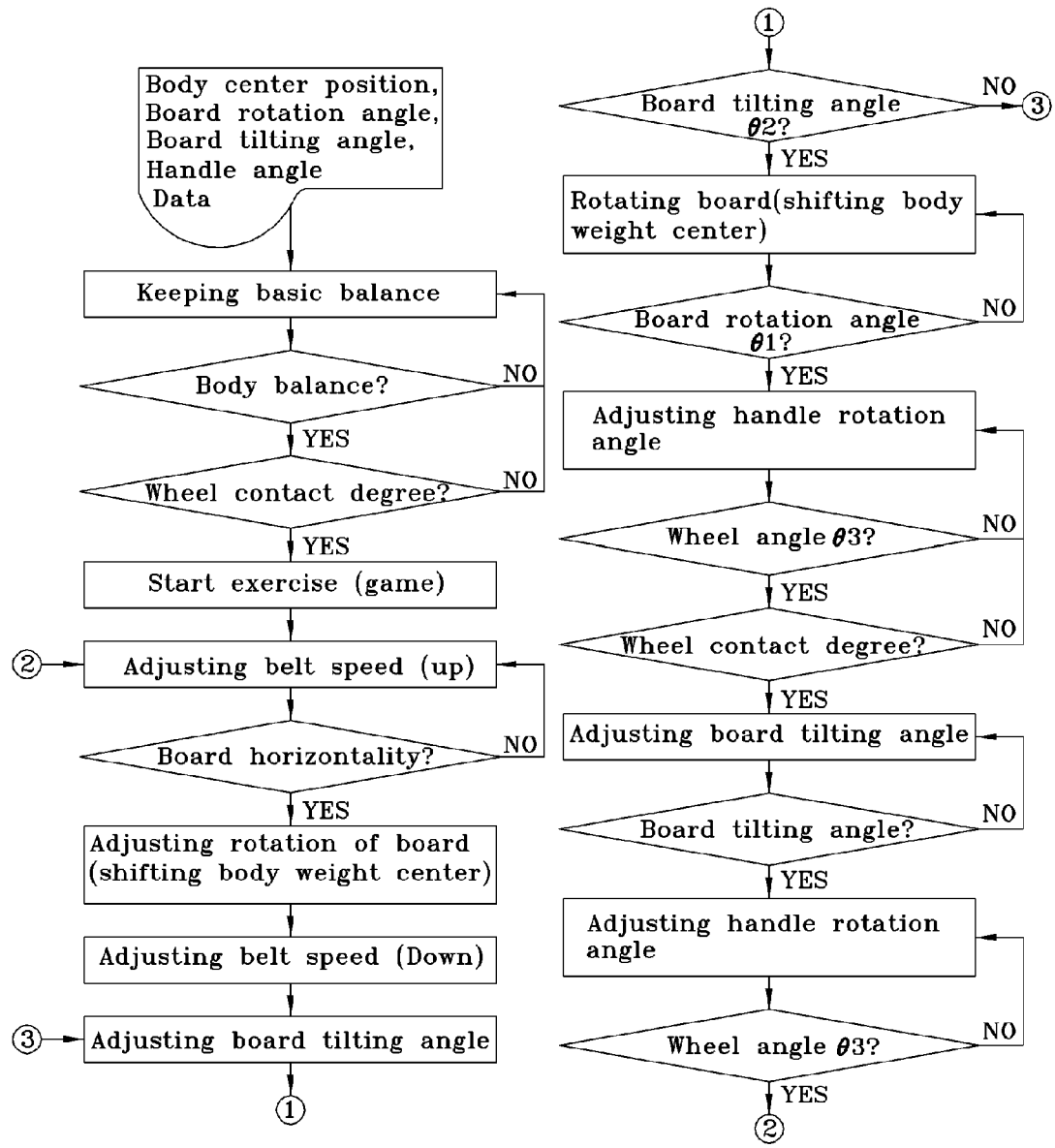
FIG. 13 is a flowchart of the operation of the present invention.
Figure 14:
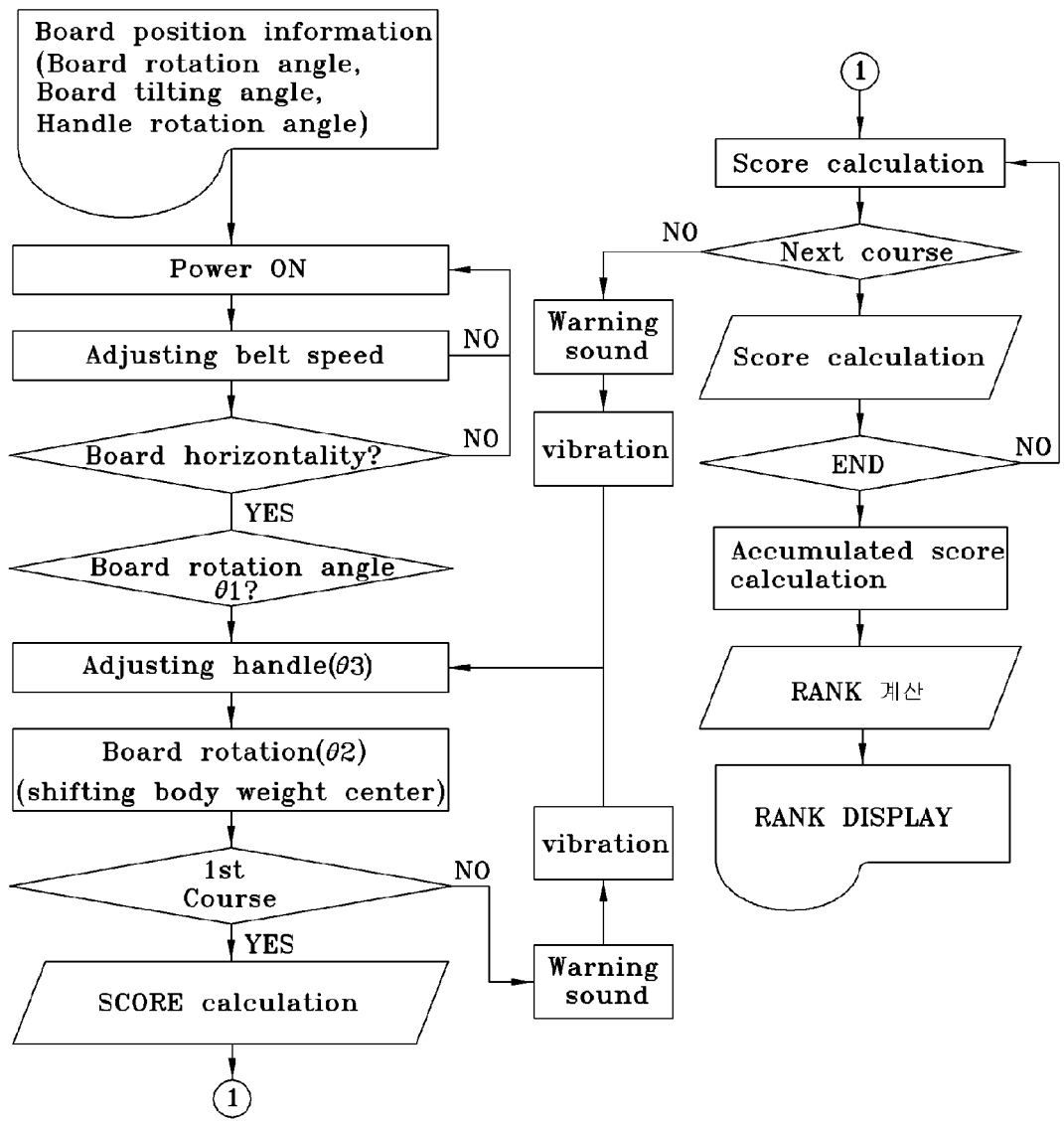
FIG. 14 is a flowchart of a method of scoring points and imposing penalty points for a game using the device of the present invention.

FIG. 13 is a flowchart of the operation of the curved track simulation device according to the present invention. FIG. 14 is a flowchart of a method of scoring points and imposing penalty points for a game using the device of the present invention. FIG. 13 illustrates, more clearly, the process of the above-mentioned operation of the device of the present invention. In other words, FIG. 13 illustrates, in a form of a flowchart, the control and manipulation of the operation of the device depending on the rotation of the direction shaft 32 and the tilting operation ($\theta 3$) of the track wheel 35 that result from the left or right rotation ($\theta 1$) and tilting operation ($\theta 2$) of the base board 31 which have been illustrated in FIG. 10. Referring to this, it can be understood that the balance of the user is related to the horizontality of the base board 31, and maintaining the base board horizontal is conducted in response to frictional force and a slip phenomenon which are generated or caused between the track belt 13 and the track wheel 35 depending on the rotation speed of the track belt 13 and the rotation angle ($\theta 3$) of the handle 42. Furthermore, depending on the extent to which the track wheel 35 comes into contact with the track belt 13, the effects of a sense of reality can be varied. This can be effectively used to simulate a variety of conditions, for example, sudden stop conditions accompanied with a safety risk, or levitation conditions such as a flying spin for a game. In addition, depending on the extent to which the track wheel 35 comes into contact with the track belt 13, the magnitude of the frictional force and the extent of slip therebetween can be adjusted or controlled.

FIG. 14 is a flowchart of a method of using an embodiment in which the curved track simulation device of the present invention is applied to a game machine combined with an exercise apparatus. Particularly, FIG. 14 illustrates an embodiment in which the track belt 13 having a motion recognition function of FIGS. 11 and 12 is connected to a game which is displayed on the display 41. According to this flowchart, the function and operation illustrated in FIGS. 11 and 12 are clearly explained. If the user exercises as if he/she is actually moving along a course track and points are added or penalty points are imposed, the user will be further interested and not grow tired of exercising, compared to a boring and simple exercise. While the user enjoys the game, the exercise effects can be enhanced, thus promoting health. Given this, the device of the present invention indeed deserves to be called an aerobic exercise machine. Typically, the phenomenon of game addiction is caused when the user enjoys a game only mentally. Hence, if a game is appropriately accompanied with exercise or sports, it is expected to promote not only physical health but also mental health.

Figure 15:
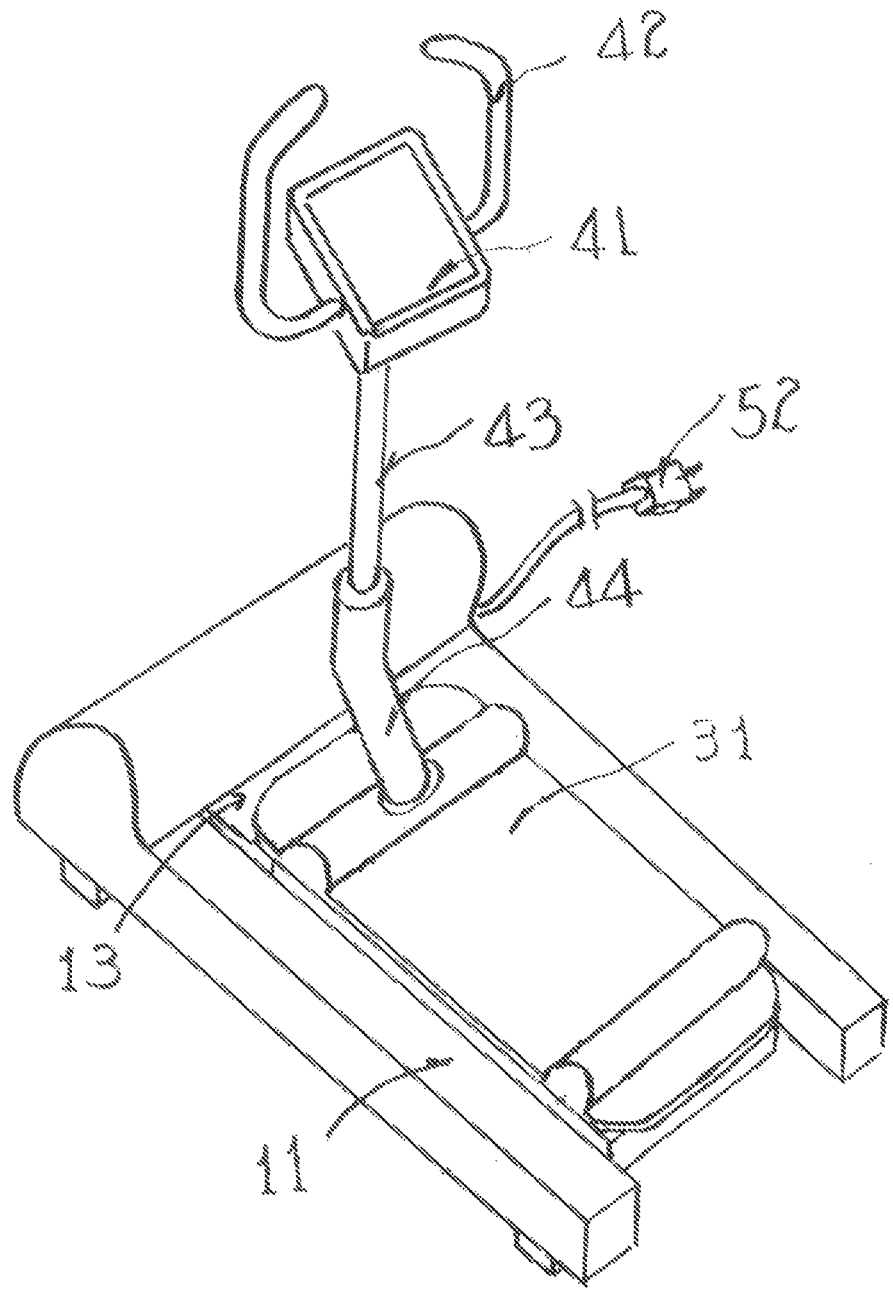
FIGS. 15 through 19 are views showing several modifications of the device according to the present invention.
Figure 16:
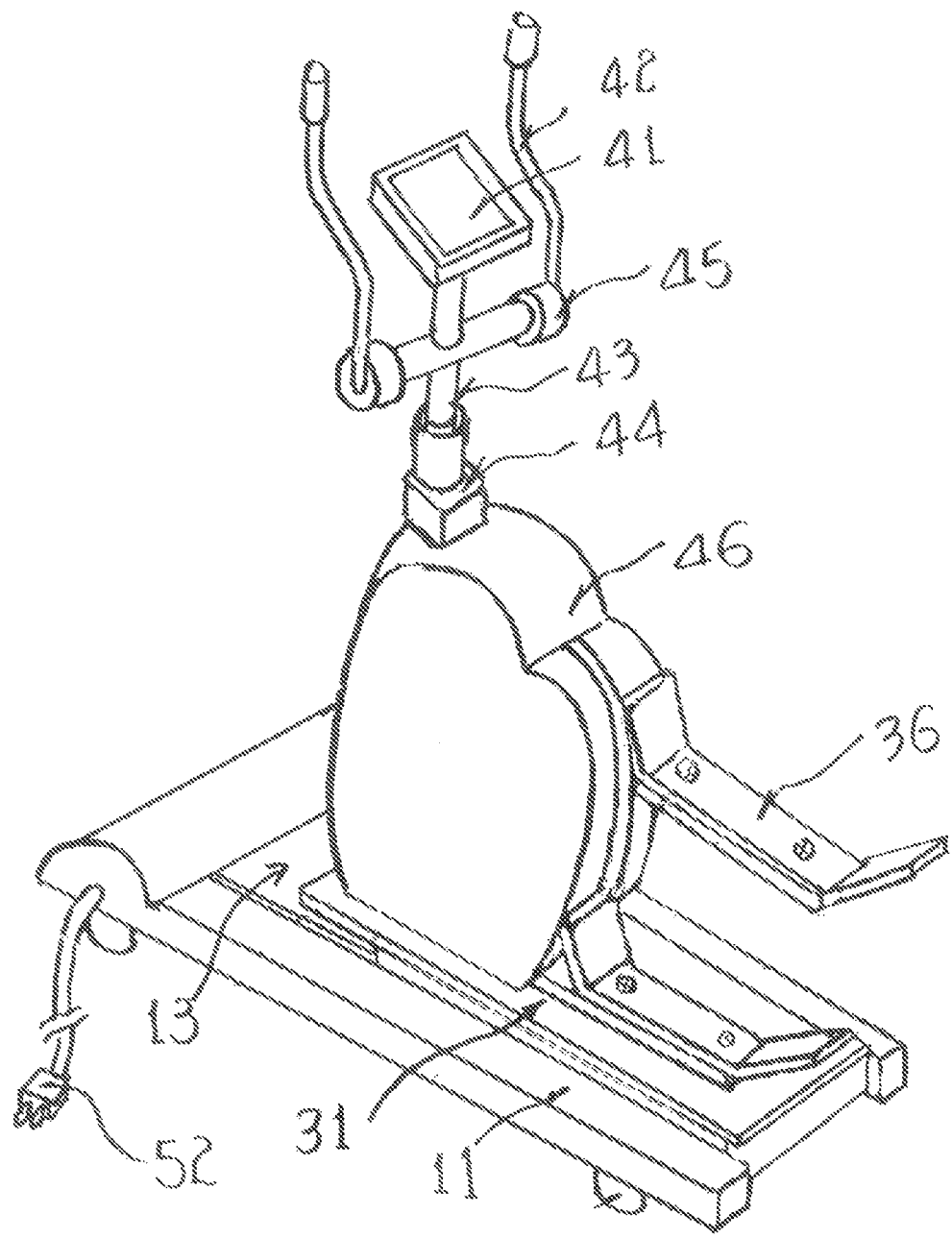
Figure 17:
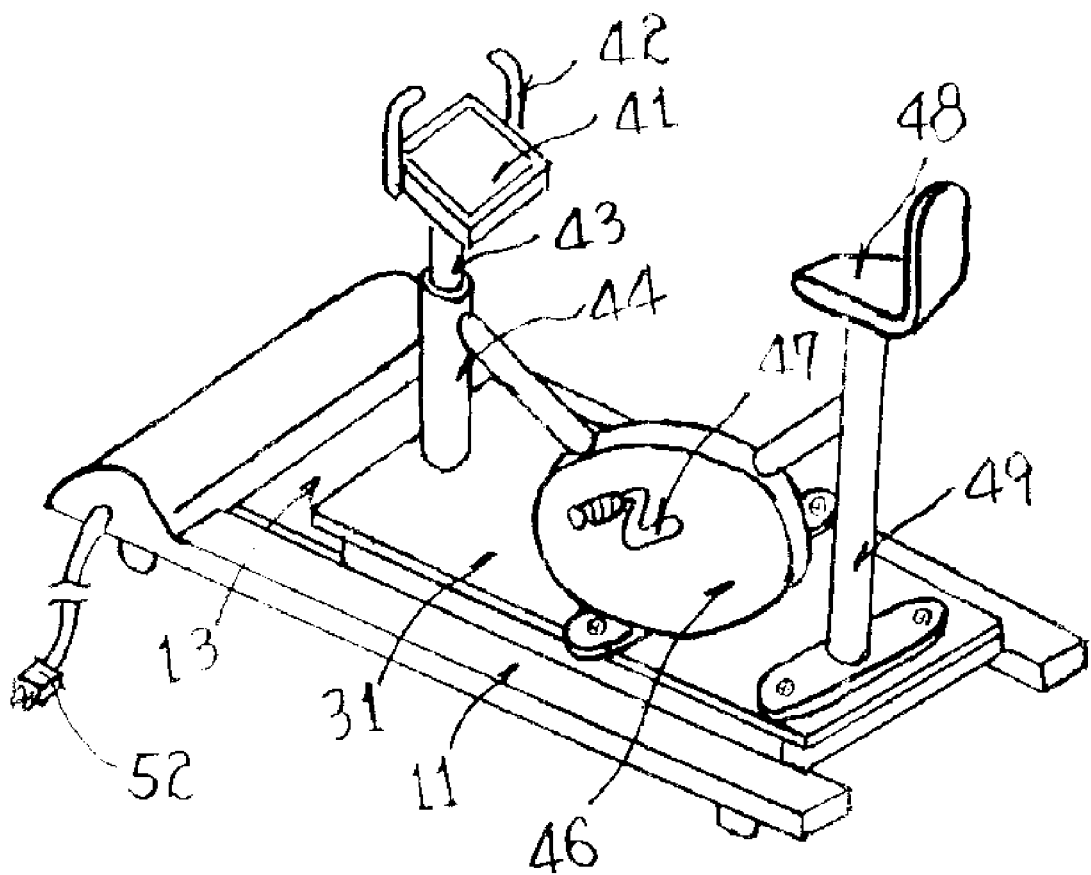
Figure 18:
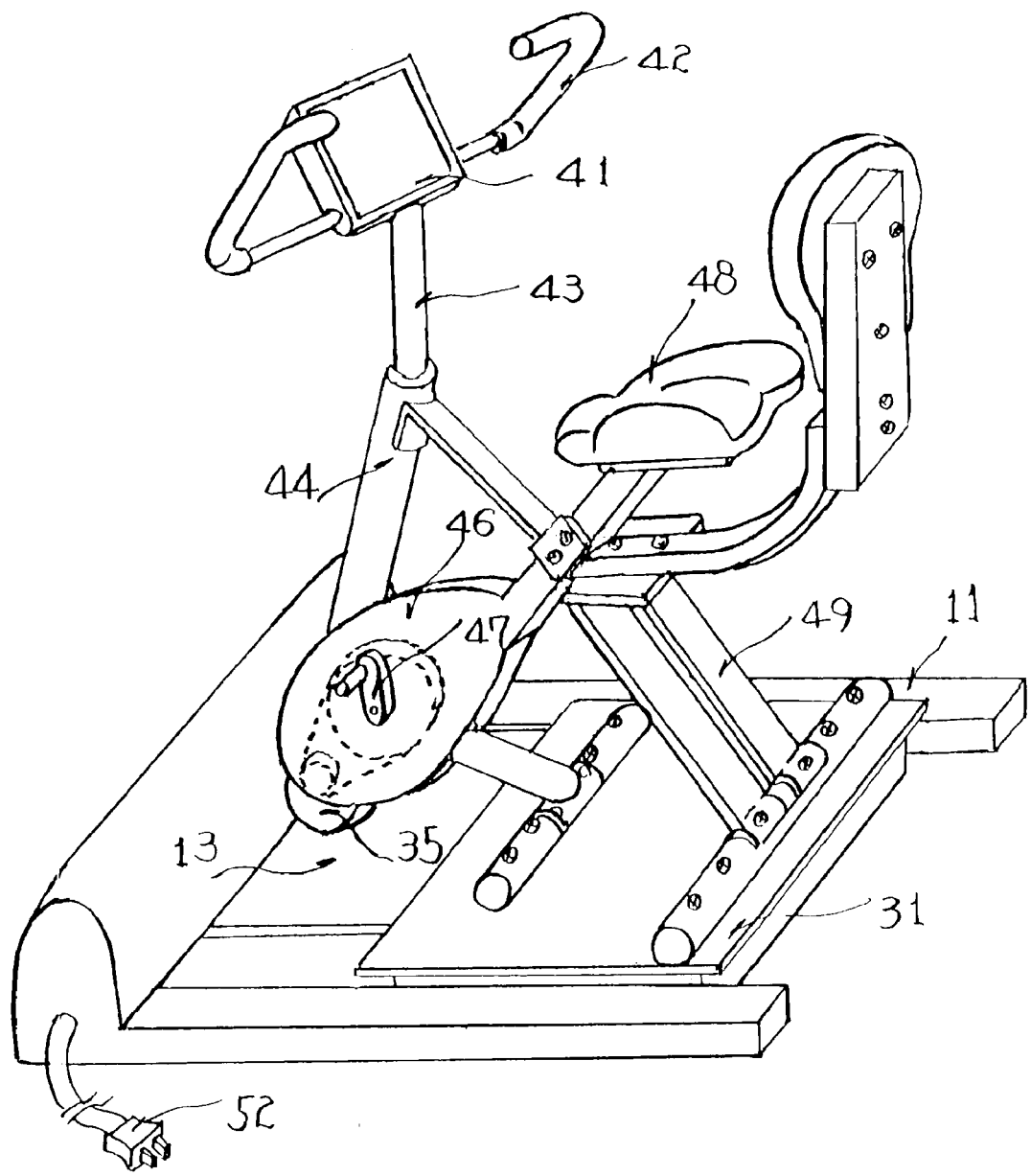

FIG. 15 is a perspective view showing an embodiment in which the device of the present invention is applied to a snowboard. FIG. 16 is a perspective view showing an embodiment in which the device of the present invention is applied to a ski type stepping exercise machine. FIG. 17 is a perspective view showing an embodiment in which the device of the present invention is applied to an exercise bicycle. FIG. 18 illustrates an embodiment in which the device is applied to an exercise bicycle in the same manner as that of FIG. 17. However, unlike that of FIG. 17, the embodiment of FIG. 18 is provided with a pedal operating unit 47 like an actual bicycle so that when the user pedals, the track wheel 35 which is connected to the pedal operating unit 47 rotates on the upper surface of the track belt 13.

Figure 19:
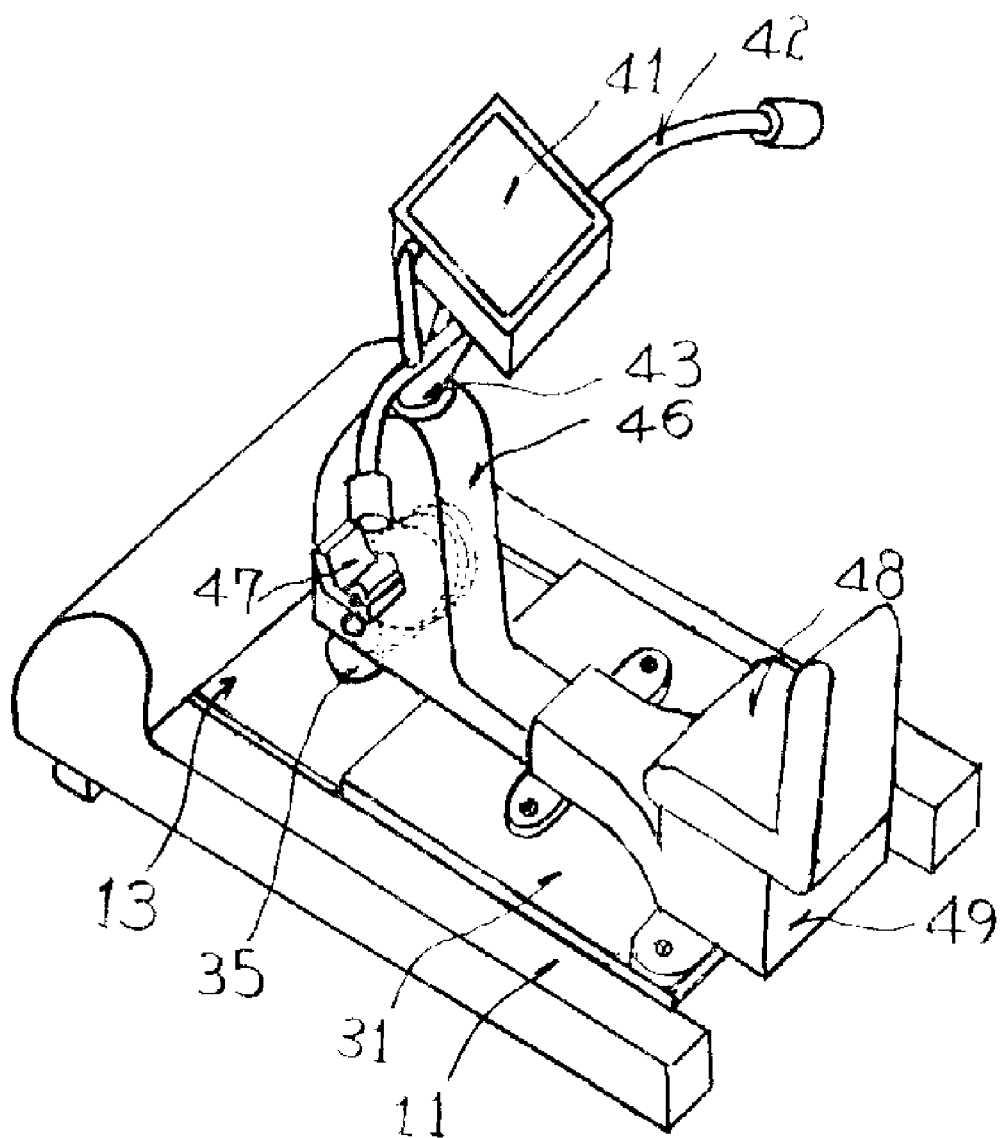

FIG. 19 is a perspective view illustrating an embodiment in which a machine having the same operation principle and function as that of FIG. 18 is applied to a simulation machine for a game. Referring to the drawings, in the case of the curved track simulation snowboard, the user places his/her feet on the base board 31 like on a snowboard. Thereafter, when the user moves the center of gravity of his/her upper body to the left or right, the base board 31 is rotated by $\theta 1$ to the left or right and is tilted by $\theta 2$. The user can grip the handle 42 using his/her one hand and change the direction of the track wheel 35. The handle 42 is coupled to the first support pole 43 and the second support pole 44. The support poles 43 and 44 are fastened to the direction shaft 32. Therefore, as the handle 42 rotates to the left or right, the track wheel 35 is rotated by $\theta 3$ in conjunction with the handle 42.

The power plug 52 is connected to a power supply to drive the electric motor 16. As stated above, the rotational force of the electric motor 16 rotates and circulates the track belt 13 forward and rearward. The rotating and tilting operation of the track wheel 35 on the upper surface of the track belt 13 is as mentioned above, therefore further explanation will be omitted. Furthermore, the display 41 conducts the same role as that of a typical monitor, and, particularly, if it is linked to a game, the exercise effects can be maximized.

Although the same general operational principle as that of FIG. 15 is used in the embodiment of FIG. 16, it is operated in a manner different from that of the snowboard of FIG. 15. In detail, when the user pushes a right ski footrest 36 using his/her right foot, the tilting direction is determined to be the right direction. Further, in a manner similar to that of skiing motion, a right handle 42 is pulled toward the body of the user, while a left handle 42 is pushed away from the body of the user. The center of gravity of the user's body leans leftward, and the base board 31 rotates to the left. In other words, in the skiing motion of the curved track simulation of FIG. 16, the posture of the user is determined depending on the operation of the ski footrests 36. The conventional stepping machine provides only the exercising effect of making the user walk hard. Hence, to steadily exercise using the conventional stepping machine, it requires patient and sufficient physical stamina of the user. That is, it requires much effort for a weak person who needs exercise to use the stepping machine. On the other hand, as stated above, if the device of FIG. 16 is connected to a game which is displayed on the display 41, this provides an added attraction. Moreover, repeating the curved track simulation skiing motion of the present invention can make the user exercise by requiring the user to twist his/her waist, thus maximizing aerobic exercise effects. Therefore, even a weak person can repeatedly exercise without getting bored of exercising.

The same operational principle of the curved track ski simulation of FIG. 16 can be applied to the curved track bicycle simulation of FIG. 17, therefore further detailed explanation of the bicycle simulation of FIG. 17 will be omitted.

The curved track simulation wheel-operating bicycle of FIG. 18 is provided with the pedal operating unit 47 in the same manner as that of an actual bicycle, as described above. Thus, just as actual bicycles do different kinds of cornering on the ground, when the user pushes a footrest provided on the pedal operating unit, the track wheel 35 directly rotates on the upper surface of the track belt 13 at rapid speed with a predetermined gear ratio. The user can exercise on the track belt 13 in the same posture and motion as those who cornering on an actual track and feel the same effects as that of the actual cornering while enjoying a game connected to the display 41. The exercise effects of this embodiment are the same as that of the other above-mentioned embodiments, so further explanation is deemed unnecessary.

FIG. 19 illustrates an embodiment in which the curved track simulation device according to the present invention is applied to a simulation machine for a game so that a game-combined exercise simulation machine can be embodied. This simulation machine for a game can be applied to a variety of driving-based or sliding-based sport games and, particularly, is suitable for racing games such as motor racing, bike racing or boat racing games. The operational principle and exercise effects of this embodiment are the same as those of the bicycle of the embodiment of FIG. 18, so further explanation will be omitted.

The invention claimed is:

1. A curved track simulation device for a physical interactive exercise or game machine using a motion simulation, comprising:
    an external body frame (11) forming an external body and a frame of the device;
    a track belt (13) to be rotated by an electric motor (16) and a control box (51) that are mounted to the external body frame (11), the track belt (13) circulating forward and rearward;
    a track wheel (35) rolling on an upper surface of the track belt (13) and conducting left-right rotation ($\theta 1$);
    a direction shaft (32) coupled to the track wheel (35) so that the left-right rotation ($\theta 1$) of the track wheel (35) is conducted by the direction shaft (32); and
    a base board (31) conducting left-right rotation ($\theta 1$) and a tilting operation ($\theta 2$).

2. The curved track simulation device according to claim 1, further comprising:
    a bearing unit (24) mounted to a lower frame (12) so as to be able to conduct left-right rotation ($\theta 1$) and a tilting operation ($\theta 2$), the lower frame (12) being coupled to the external body frame (11);
    a middle frame (22) conducting a tilting operation ($\theta 2$) using a bearing (23) without conducting left-right rotation ($\theta 1$), the bearing (23) being mounted to a rotating shaft (29) coupled to the bearing unit (24);
    a spring unit (28) providing restoring force to remain level when the tilting operation ($\theta 2$) of the middle frame (22) is conducted; and
    an upper frame (21) conducting left-right rotation ($\theta 1$) using the bearing unit (24), the upper frame (21) being provided with a rod end bearing (25) operated in conjunction with the rotation of the upper frame (21), wherein the track wheel (35) is coupled to the upper frame (21).

3. The curved track simulation device according to claim 2, wherein the rod end bearing (25) and a rod end bearing are respectively mounted to a lower surface of the upper frame (21) and an upper surface of the lower frame (12) and connected to a rotation support rod (27) between the upper frame (21) and the lower frame (12) so that the rotation support rod (27) supports the upper frame (21) and the lower frame (12) so as to able to conduct left-right rotation ($\theta 1$) and tilting operation ($\theta 2$).

4. The curved track simulation device according to claim 1, further comprising a bearing unit provided between the track wheel (35) and the direction shaft (32) to enable the track wheel (35) to conduct a left-right tilting operation ($\theta 2'$).

5. The curved track simulation device according to claim 4, further comprising
    an elastic member such as a spring (34) provided to generate restoring force to maintain level when the bearing unit (33) conducts the rolling operation ($\theta 2'$).

6. The curved track simulation device according to claim 1, wherein the track belt (13) comprises a track belt (13) provided with a sensor (54) monitoring a track while the track belt (13) is operated.

7. The curved track simulation device according to claim 1, wherein an uneven portion is formed on the upper surface of the track belt (13) so that the track wheel (35) vibrates on the uneven portion and the vibration of the track wheel (35) is transmitted to the base board (31).

* * * * *